United States Patent [19]
Buckley et al.

[11] Patent Number: 5,489,012
[45] Date of Patent: Feb. 6, 1996

[54] CLUTCH CONTROL SYSTEM

[75] Inventors: Stephen D. Buckley, Solihull; Ian D. Kennedy, Leamington Spa, both of Great Britain

[73] Assignee: Automotive Products, plc, Leamington Spa, Great Britain

[21] Appl. No.: 244,080

[22] PCT Filed: Nov. 19, 1992

[86] PCT No.: PCT/GB92/02138

§ 371 Date: May 17, 1994

§ 102(e) Date: May 17, 1994

[87] PCT Pub. No.: WO93/10994

PCT Pub. Date: Jun. 10, 1993

[30] Foreign Application Priority Data

Nov. 27, 1991 [GB] United Kingdom .............. 9125161

[51] Int. Cl.⁶ .......................... B60K 41/22; F16D 48/06
[52] U.S. Cl. ........................................ 192/3.63; 477/175
[58] Field of Search ........................... 192/3.63, 3.62, 192/3.58; 477/85, 175

[56] References Cited

U.S. PATENT DOCUMENTS

| 4,200,175 | 4/1980 | Dick ............................................ 477/175 |
| 4,432,445 | 2/1984 | Windsor . |
| 4,473,143 | 9/1984 | Windsor ........................... 192/3.58 X |
| 4,497,397 | 2/1985 | Windsor et al. . |
| 4,561,530 | 12/1985 | Parsons et al. . |
| 4,618,043 | 10/1986 | Hattori et al. ......................... 477/85 |
| 4,971,183 | 11/1990 | Tellert .............................. 192/3.63 X |
| 5,082,096 | 1/1992 | Yamashita et al. ..................... 477/175 |

FOREIGN PATENT DOCUMENTS

| 2613987 | 10/1988 | France . |
| WO92/08065 | 5/1992 | WIPO . |

Primary Examiner—Rodney H. Bonck
Attorney, Agent, or Firm—Paul E. Milliken; Lee A. Germain

[57] ABSTRACT

A system for preventing a vehicle from running away downhill and for ensuring a smooth take-up from rest, in which signals proportional to engine speed (Ve) and vehicle speed (Vdp) are used. The engine speed signal is compared with a reference signal (Vs) to produce an engagement signal (E) which controls a clutch actuation means for engagement of the clutch. The vehicle speed signal (Vdp) and the engine speed signal (Ve) are fed into a filter (71) which produces a clutch actuation signal if either (Vdp or E) exceeds a predetermined value.

10 Claims, 4 Drawing Sheets

CLUTCH CONTROL SYSTEM

The present invention relates to a clutch control system for a vehicle.

Our earlier patent GB 2 088 007 describes a clutch control system in which the clutch is progressively engaged as the torque demand issued by the driver increases to temporarily limit the engine speed to a set value. This provides a smooth take up from rest. It is a disadvantage of these systems as described that if the vehicle while in gear should roll down a hill gathering speed while the engine is still idle, the clutch will not engage to provide a degree of braking, nor can the driver make it engage without speeding up the engine using the speed control means, an action that would appear to him totally unnatural in a circumstance when he wanted to cause the vehicle to be restrained. Furthermore, if the engine cannot be started due to failure or partial failure of the self-starting system, the engine cannot be started by any of the commonly accepted emergency starting means such as push starting or tow-starting. It is an object of the present invention to overcome these disadvantages.

The present invention provides a clutch control system for a vehicle having a clutch, a gearbox and an engine, the system comprising a vehicle speed sensor for generating a vehicle speed signal variable with the speed of the vehicle, a clutch engagement signal generator that produces a signal utilised for controlling a clutch actuation means that operates the clutch engagement, a filter means that receives the engagement signal and the engine speed to generate a clutch actuation means for engagement of the clutch in the event that either the vehicle speed signal and/or the engagement signal exceeds a predetermined minimum value.

Preferred embodiments of the invention will now be described by way of example only with reference to the accompanying drawings in which.

Figure 1:
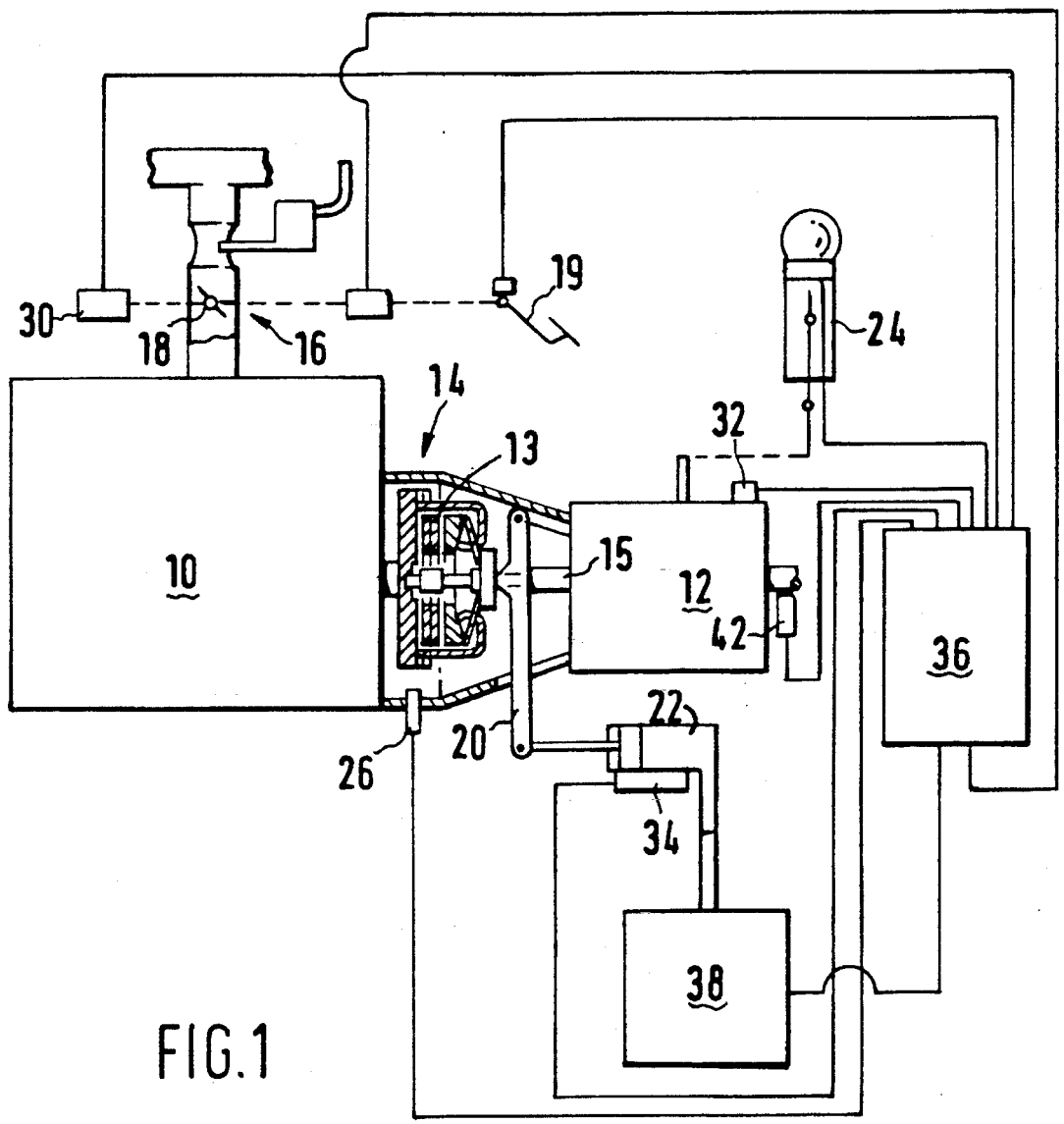
FIG. 1 is a schematic of a control system according to a first embodiment of the present invention.

Referring to FIG. 1 a vehicle comprises an engine 10 and a gearbox 12 coupled through a clutch 14, via a clutch driven plate 13 and a gearbox input shaft 15. Fuel is supplied to the engine by a throttle 16 which includes a throttle valve 18 operated by accelerator pedal 19. The clutch 14 is actuated by a release fork 20 which is operated by a slave cylinder 22. The gearbox is operated by a gear lever 24.

An engine speed signal generator comprises an engine speed sensor 26 which includes a transducer. The state of the throttle valve 18 is monitored by a throttle valve position sensor 30. The state of the gearbox 12 is monitored by a gear position sensor 32. The position of the slave cylinder 22 is monitored by an actuation sensor 34. The speed of the gearbox output shaft 15 is monitored by a vehicle speed sensor 42. Since the speed of the vehicle depends on the driven plate speed and the gear engaged, the speed sensor can be used to calculate the driven plate speed. Signals from the sensors are transmitted to a control unit 36 which controls the actuation of the clutch via a hydraulic control 38.

Figure 2:
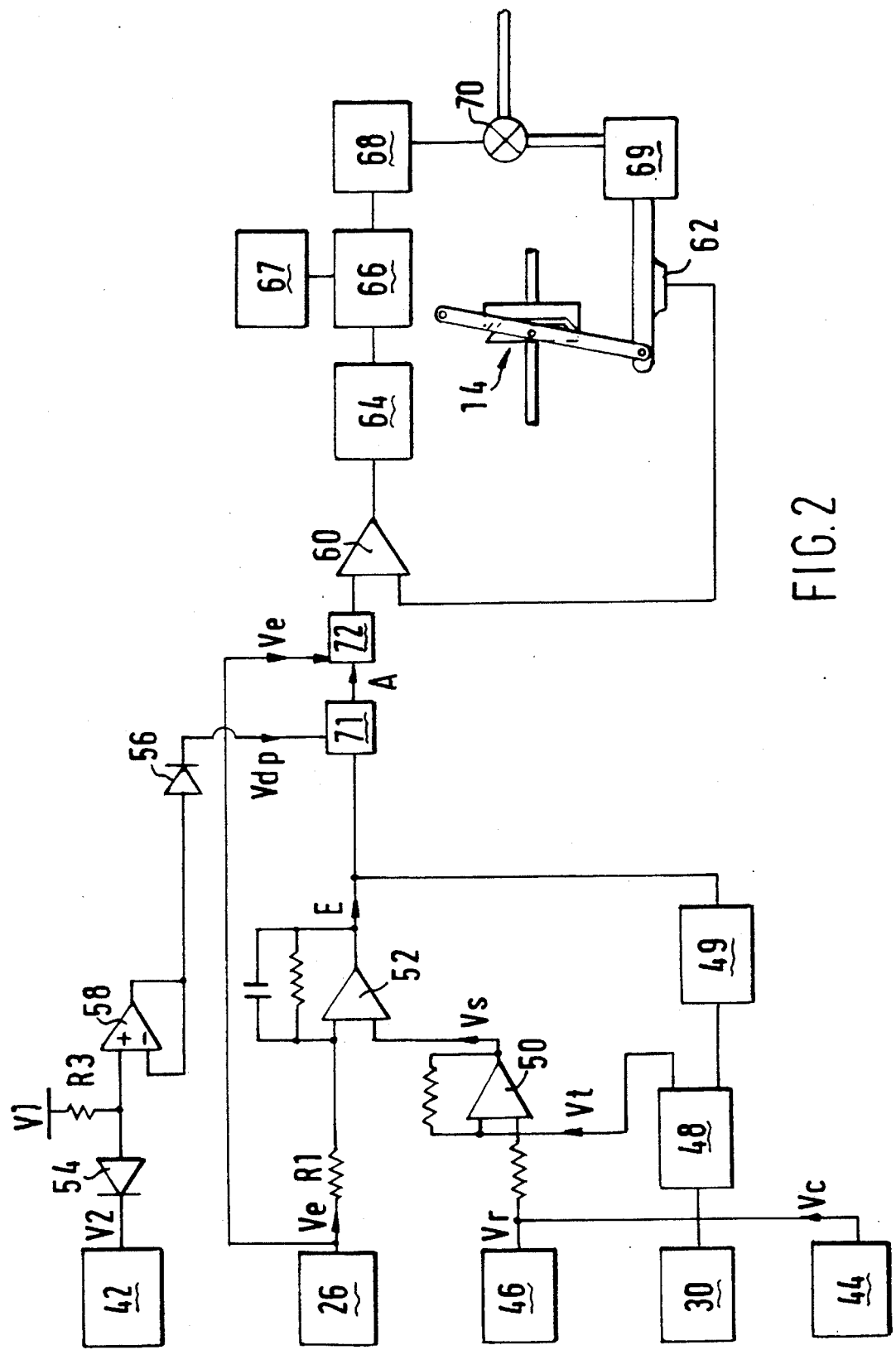
FIG. 2 is an analogue circuit diagram of the control system of FIG. 1.

Referring to FIG. 2, the system also includes a choke position sensor 44 and a reference signal generator 46. The throttle position sensor 30 produces a throttle signal Vt which is fed to an inverting input of a difference amplifier 50 via a limiter 48. The limiter 48 receives an input from a switching circuit 49. A reference signal Vr from the reference signal generator 46 is combined with a choke signal Vc from the choke position sensor 44 and input to the difference amplifier 50. The output Vs of the difference amplifier 50, being the sum of Vt, Vr and Vc, forms a modified reference signal which is fed to the input of a comparator 52.

The engine speed sensor 26 produces an engine speed signal Ve which is fed via the resistor R1 to the comparator 52. The speed sensor 42 produces a signal V2 which is fed to a circuit containing diodes 54 and 56 and a high impedance buffer 58. The diode 54 has its output connected via a resistance R3 to a supply of constant voltage V1 which in this case is 5 v. The input of the diode 54 is connected via the high impedance buffer 58 to the input of the diode 56, the output Vdp of which is connected to a filter 71. The output Vdp from this circuit forms a vehicle speed signal.

The comparator 52 produces a clutch engagement signal E which equals the difference between the modified reference signal Vs and the engine speed signal Ve.

The error signal E is also fed into an input of the filter 71 which operates to allow either signal Vdp or E to pass through should either of said signals exceed a predetermined minimum value. The clutch actuator signal A from the filter 71 passes to a anti-stall limiter 72. The limiter 72 receives the engine speed signal Ve and is an enable/disable switch that operates to determine the maximum degree of engagement of the clutch above an engine speed 600 rpm and does not switch off until the engine speed falls to 0 rpm.

The limiter 72 is connected to a clutch position control comparator 60 the other input of which receives a signal from a clutch position sensor 62. The output from the comparator 60 is fed via a phase gain shaping network 64 to a mark to space ratio modulator 66 which also has as input a signal from an oscillator 67. The output signal from the mark to space ratio modulator 66 is fed via an output 68 to a valve 70, which controls the position of the clutch 14 via a hydraulic control 69. In an alternative circuit the output from comparator 60 may be fed into a current feed back amplifier which drives the control valve 70.

During normal operation when the vehicle is at rest and the engine is idling neither Ve nor Vdp is greater than the reference signal Vs so the engagement signal E is positive and the clutch is held in a fully disengaged position by the actuator 72. If the car is stationary and in gear and the throttle is depressed Vdp is zero and the engine speed increases until Ve is greater than Vs. At that point E goes negative. This causes the clutch to engage slightly which slows the engine, reducing Ve and tending to keep E at zero. Provided the throttle is kept depressed the tendency of the engine speed to increase will engage the clutch.

If, again starting from rest, the vehicle begins to roll say down hill with the engine idling, the speed signal Vdp will increase with vehicle speed and the engagement signal E will be positive. When Vdp exceeds a predetermined value it will cause the clutch actuator control systems 60,62,64, 66,67,68 etc. to operate independently of the engagement signal E to engage the clutch causing the engine speed signal Ve to increase. When Ve becomes equal to Vs the engagement signal E overrides the signal to control clutch engagement.

In order to provide a safe tow-start facility, then if the engine is not running and the vehicle is not in gear and the road speed is above a second predetermined value, the clutch will be prevented from engaging unless the vehicle transmission is firstly in neutral. The system is sensitive to the selection of neutral or a given gear through the sensor 32 which also indicates if the lever 24 is subsequently used to move from neutral to select a gear which the clutch will engage. This prevents "bump starting" if the driver is not in the driving seat.

When the clutch is fully engaged no further engine braking can be provided by the clutch and E will go negative with increasing magnitude. If the vehicle is then slowed under engine braking or for example, if the driver brakes, Vdp will decrease, but the error signal E will ensure that the clutch remains engaged unless E starts to go positive. At that point the actuator 72 will start to disengage the clutch in that E is held at zero. If the vehicle is slowed sufficiently by the brakes Vdp will go to zero and the clutch will be completely disengaged.

If the road speed is less than a further third predetermined value and the engine is not running then the clutch will be caused to disengage.

Figure 4:
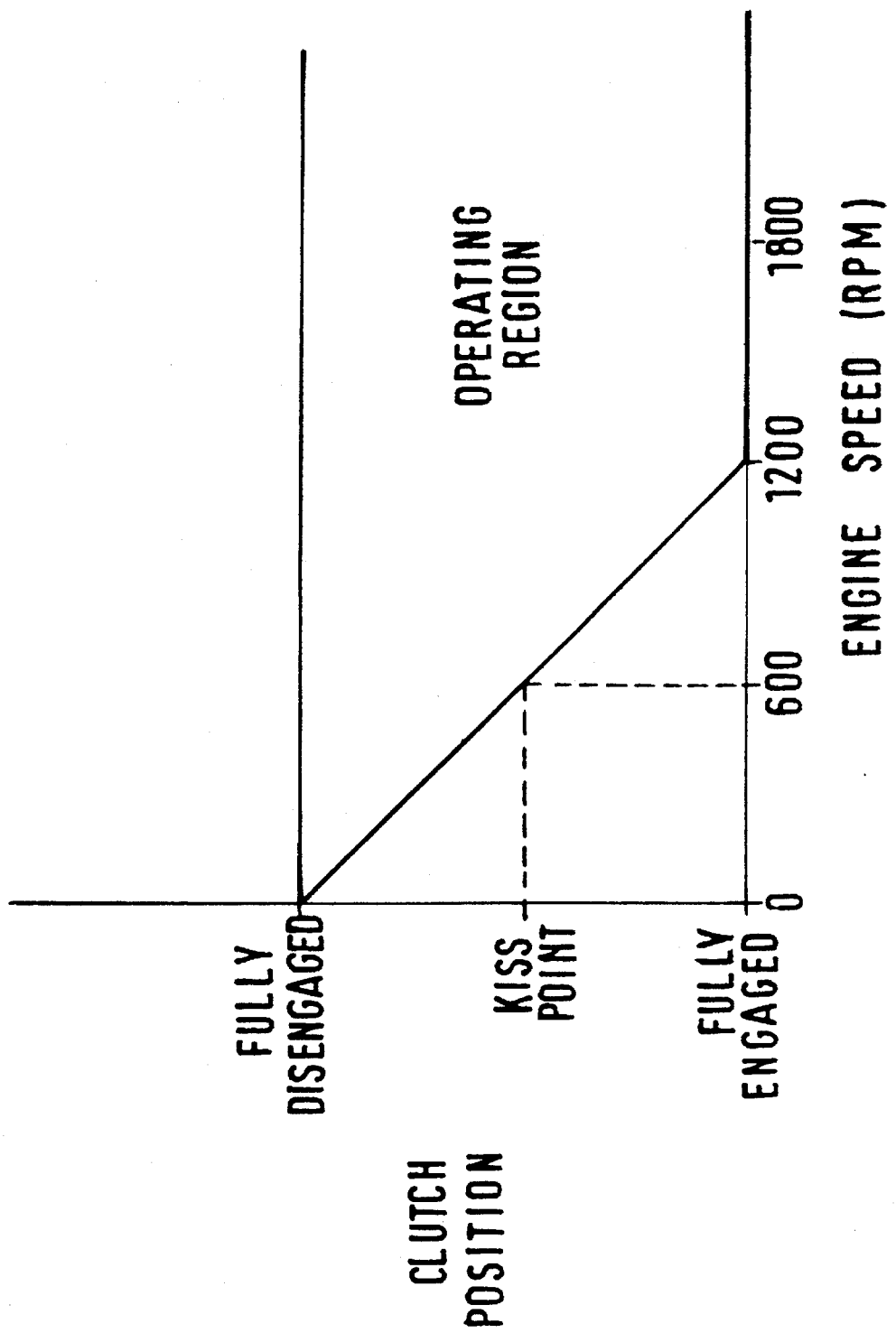
FIG. 4 is a graph of the clutch position Vs engine speed illustrating operation of the clutch stall limiter.

If the vehicle is resting on a slope such that the direction of rotation of the clutch driven plate 13 is in the opposite sense to the rotation of the engine, engaging a gear may stall the engine. This condition occurs if the vehicle is say pointing up a hill and an attempt is made to engage a forward gear, or the vehicle is pointing downhill and an attempt is made to engage reverse gear. The limiter 72 prevents engine stall by limiting the clutch engagement to a maximum torque determined by the engine speed signal Ve. The limiter is only triggered to operate when the engine speed exceeds 600 rpm to allow the tow start to operate. The clutch is operated to be fully disengaged at 0 rpm and fully engaged at 1200 rpm. In normal operation the clutch will begin to engage above 600 rpm. Should the engine speed fall as the clutch is engaged the reduction in the engine speed signal will cause the clutch to disengage. This is shown in FIG. 4. To engage the clutch the engine speed must be increased allowing a higher than normal torque to pass through the clutch.

If say the vehicle is pointing downhill and begins to move while in gear the clutch is ramped to a torque level which is sufficient to raise engine speed to control vehicle speed. When the engine speed signal reaches Ve=Vs, the clutch is then used to control engine speed.

In the embodiment described above Vdp will be proportional to the speed at which the vehicle is rolling. The driven plate speed can be computed if required by a constant of proportional which will depend on which gear is engaged.

Any parameter directly proportional to driven plate speed could be used to give a similar result. For this purpose the gear position sensor would be used.

Figure 3:
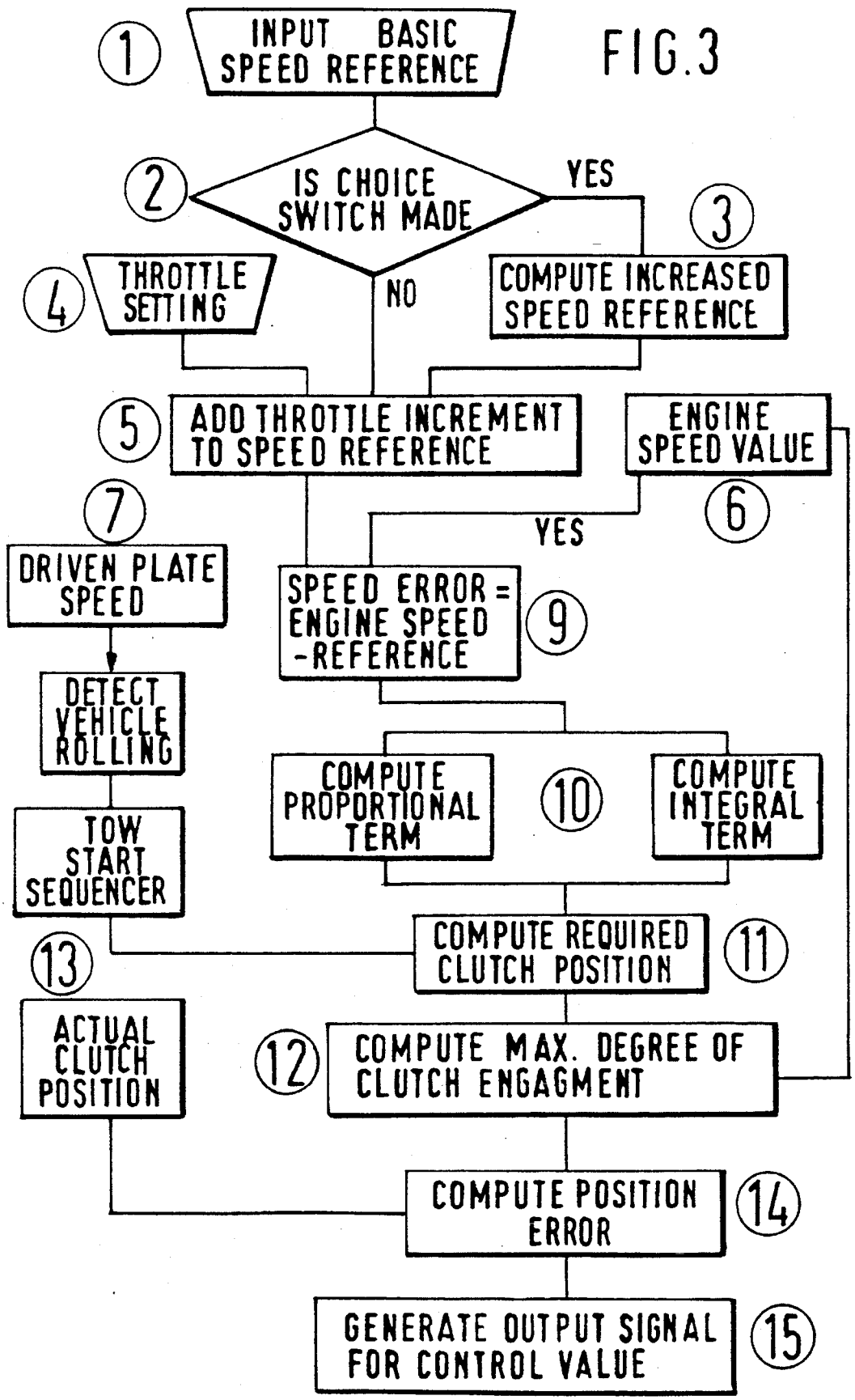
FIG. 3 is a block diagram showing the steps used in a microprocessor in a second embodiment of the invention.

Referring to FIG. 3 in a further embodiment of the invention the processing of signals from the sensors and the production of a signal for actuation of the clutch is performed by a microprocessor. At step 1 a basic speed reference is retrieved, the value of the speed reference having been set when the microprocessor was produced. At step 2 the idle speed is examined. The idle speed would have a set value which could be set higher, eg for a cold start. If the idle speed is set high, the microprocessor proceeds to step 3 to compute an increased speed reference. If the idle speed is at its normal set value step 3 is bypassed and the speed reference is unaltered. At step 4 a throttle setting signal is generated, and at step 5 the speed reference is increased by an increment dependent on the throttle setting signal. At step 6 an engine speed signal is generated and this is compared with the reference signal at step 9 to produce a speed error signal representing the difference between the engine speed and reference speed. The error signal and the integral with respect to time of the error signal are generated at step 10 and combined to determine at step 11 a required clutch position. When the error reaches zero or is negative the error signal and its integral are used in combination. An actual clutch position signal is generated at step 12 and composed with the required clutch position signal at step 13 to produce a position error, which generates at step 14 an output signal for the control valve 70 of the clutch hydraulic actuation.

At step 7 a vehicle speed signal is generated and if the car is sequentially placed in neutral, then in gear, and is moving at more than a predetermined speed a vehicle rolling signal is generated which is fed into the step 11. This will cause the clutch to engage independently of the error signal, and allow the vehicle to be tow-started.

The microprocessor software operates to cause a full clutch engagement above a predetermined road speed and/or a predetermined engine speed. Below the predetermined engine speed assuming a stationary vehicle the engagement of the clutch is proportional to the engine speed signal.

In a further refinement, if the vehicle is running downhill and the engine running, when the vehicle speed exceeds a predetermined value the clutch is ramped to a torque level of engagement in order to increase the engine speed, or until the engine speed increases above a predetermined level, and hence the level of clutch engagement is self-tuning to the state of the engine.

The microprocessor may also be altered so as to operate in an equivalent manner to the analogue circuit described in our earlier U.S. Pat. No. 2,079,088, which provides an improved hill start capacity.

As with the analogue system, the part of the microprocessor with forms a comparator means for performing steps 6 to 9 could be arranged differently and the order of the comparisons of engine speed, driven plate speed and reference could be altered. For example the engine speed signal and driven plate speed signal could each be compared with the reference signal to produce two error signals, the greater of which could be used to compute a required clutch position.

In order to push start the vehicle a low gear is engaged and the vehicle pushed. The clutch system will act in the same ways as in the downhill rolling situation and engagement of the clutch will occur. Provided the pushing force is strong enough to turn the engine it will start up.

The clutch engagement signal from the step 11 is passed into a step 12 to compute to maximise engagement of the clutch set by the engine speed signal. This step is only triggered when the engine speed exceeds 600 rpm on start up.

Step 14 compares the actual clutch position from step 13 with the maximum engagement clutch position from step 12 and generates an output at 15 which causes the clutch to engage to the desired position, if this is within the limit set by the engine speed value. If not the clutch will only engage up to a maximum torque set by the engine speed value.

We claim:

1. A friction clutch control system for a vehicle having a clutch, a gearbox and an engine, the system comprising a vehicle speed sensor for generating a vehicle speed signal variable with the speed of the vehicle, a clutch engagement signal generator that produces an engagement signal utilised for controlling a clutch actuation means that operates the clutch engagement, a filter means that receives the engagement signal and the vehicle speed signal to generate a clutch actuation signal for operation of the clutch actuation means for engagement of the clutch in the event that either the vehicle speed signal and/or the engagement signal exceeds a predetermined minimum value.

2. A system according to claim 1, wherein the clutch actuation signal is passed into a limiter which also receives a vehicle engine speed signal, the limiter being enabled by the engine speed exceeding a predetermined value, so that the engagement of the clutch is proportional to the engine speed up to a second predetermined value of engine speed where the clutch can be fully engaged.

3. A clutch control system according to claim 2 wherein the filter means, limiter and clutch actuation means comprises a microprocessor.

4. A system according to claim 2 which further includes, a gear sensor used for controlling the clutch actuation means, so that when the engine is not running, the clutch is only engageable when the vehicle speed signal exceeds a minimum value, the vehicle is in neutral, and then the vehicle is subsequently put in gear.

5. A system according to claim 1 which further includes, a gear position sensor used for controlling the clutch actuation means, so that when the engine is not running, the clutch is only engageable when the vehicle speed signal exceeds a minimum value, the vehicle is in neutral, and then the vehicle is subsequently put in gear.

6. A system as claimed in claim 1, wherein when the engine is running and the vehicle speed exceeds said predetermined value, the clutch is ramped to a level of engagement in order to control the engine speed to a predetermined level.

7. A system as claimed in claim 1 wherein when the engine is not running, and the vehicle speed drops below a further predetermined value the clutch is caused to disengage.

8. A system according to claim 7 wherein the vehicle speed sensor further comprises means for varying the vehicle speed signal according to the state of the gearbox.

9. A system according to claim 1 wherein the vehicle speed sensor comprises means for measuring the speed of rotation of a driven plate of the clutch.

10. A system according to claim 1 wherein the vehicle speed sensor comprises means for measuring the speed of rotation of an output from the gearbox.

* * * * *